(12) United States Patent
Chang et al.

(10) Patent No.: US 9,069,463 B2
(45) Date of Patent: Jun. 30, 2015

(54) TOUCH APPARATUS AND OPERATING METHOD THEREOF

(71) Applicant: COMPAL ELECTRONICS, INC., Taipei (TW)

(72) Inventors: Ming-Yu Chang, Taipei (TW); Chun-Ming Wang, Taipei (TW); Yun-Rui Chen, Taipei (TW); Chia-Hui Chen, Taipei (TW); Wen-Han Li, Taipei (TW); Fei-Zhi Guo, Taipei (TW); Ping-Hsien Niu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 121 days.

(21) Appl. No.: 14/029,817

(22) Filed: Sep. 18, 2013

(65) Prior Publication Data
US 2014/0285447 A1    Sep. 25, 2014

(30) Foreign Application Priority Data
Mar. 19, 2013 (TW) .............................. 102109704 A

(51) Int. Cl.
G06F 3/0488    (2013.01)
G06F 3/041    (2006.01)

(52) U.S. Cl.
CPC .......... *G06F 3/04883* (2013.01); *G06F 3/0418* (2013.01)

(58) Field of Classification Search
CPC ..... G06F 3/041; G06F 3/0416; G06F 3/0418; G06F 3/0488; G06F 3/04883; G06F 2203/04104
USPC .......................................... 345/173, 174, 178
See application file for complete search history.

(56) References Cited

U.S. PATENT DOCUMENTS

| | | | |
|---|---|---|---|
| 7,012,595 B2 * | 3/2006 | Lu .................... | 345/173 |
| 8,248,376 B2 * | 8/2012 | Brown et al. ................. | 345/173 |
| 8,669,962 B2 * | 3/2014 | Kuan ............................ | 345/174 |
| 8,917,249 B1 * | 12/2014 | Buuck et al. ................... | 345/173 |
| 2009/0153495 A1 * | 6/2009 | Chen et al. ..................... | 345/173 |
| 2010/0149130 A1 | 6/2010 | Jung et al. | |
| 2011/0187651 A1 * | 8/2011 | Whitlow et al. .............. | 345/173 |
| 2011/0267181 A1 * | 11/2011 | Kildal ........................ | 340/407.2 |
| 2012/0293551 A1 * | 11/2012 | Momeyer et al. ............. | 345/633 |
| 2013/0033433 A1 * | 2/2013 | Rogers et al. ................. | 345/173 |
| 2013/0120464 A1 * | 5/2013 | Wei et al. ...................... | 345/672 |

* cited by examiner

*Primary Examiner* — Tom Sheng
(74) *Attorney, Agent, or Firm* — CKC & Partners Co., Ltd.

(57) ABSTRACT

An operating method for dynamically adjusting a touch apparatus is disclosed herein. The touch apparatus includes a storage component and a touch component. The storage component is configured to store at least one application, and a plurality of weights of touch motion modes and touch motion modes corresponding to the application. The operating method includes determining whether execution of the application has started. When execution of the application has started, a plurality of touch motions corresponding to the executed application are received through the touch component. At least one of the weights of touch motion modes corresponding to the executed application is adjusted according to the touch motions. At least one of touch parameters is adjusted according to the weights of touch motion modes corresponding to the executed application.

12 Claims, 5 Drawing Sheets

| loading level | touch motion mode | APP1 (messaging application program) | APP2 (game) | APP3 (image browser) |
|---|---|---|---|---|
| level 10 | high-frequency multi-slide mode | W110 | W210 | W310 |
| level 9 | low-frequency multi-slide mode | W109 | W209 | W309 |
| ⋮ | ⋮ | ⋮ | ⋮ | ⋮ |
| level 2 | low-frequency single-slide mode | W102 | W202 | W302 |
| level 1 | low-frequency single-tap mode | W101 | W201 | W301 |
| level 0 | no touch | W100 | W200 | W300 |

Fig. 2

TOUCH APPARATUS AND OPERATING METHOD THEREOF

RELATED APPLICATIONS

This application claims priority to Taiwan Application Serial Number 102109704, filed Mar. 19, 2013, which is herein incorporated by reference.

BACKGROUND

1. Technical Field

The present disclosure relates to an electronic apparatus and an operating method thereof. More particularly, the present invention relates to a touch apparatus and an operating method thereof.

2. Description of Related Art

With advances in technology, touch apparatuses such as smartphones and tablet computers are widely used in our daily lives.

A touch apparatus typically includes a touch component and a processing component. The touch component can receive a touch motion inputted by a user and transmit a corresponding signal to the processing component. The processing component can analyze the signal corresponding to the touch motion and perform control in response of the touch motion. The performance of the touch component is positively correlated to the power consumption rate of the touch component. For example, the higher the hardware sensor scan rate or the hardware sensor repeat time of the touch component, the higher the power consumption rate of the touch component. On the other hand, if a lower power consumption rate of the touch component is desired, a lower performance (e.g., hardware sensor scan rate or hardware sensor repeat time) of the touch component will result.

Therefore, there is a need to overcome the problem of this trade-off between the performance and the power consumption rate of the touch component.

SUMMARY

One aspect of the present invention is directed to an operating method for dynamically adjusting a plurality of touch parameters of a touch apparatus. In accordance with one embodiment of the present invention, the touch apparatus includes a storage component, a touch component, and a processing component. The storage component is configured to store at least one application program, a plurality of weights of touch motion modes corresponding to the application program, and a plurality of touch motion modes corresponding to the application program. The weights of touch motion modes respectively correspond to the touch motion modes. The operating method includes determining whether execution of the application program has started; receiving, through the touch component, a plurality of touch motions corresponding to the executed application program when execution of the application program has started; adjusting at least one of the weights of touch motion modes corresponding to the executed application program according to the touch motions; and adjusting at least one of the touch parameters according to the weights of touch motion modes corresponding to the executed application program.

In accordance with one embodiment of the present invention, the step of adjusting at least one of the weights of touch motion modes corresponding to the executed application program according to the touch motions includes determining whether each of the touch motions is a tap or a slide; determining whether each of the touch motions is a single-touch or a multi-touch; calculating a plurality of time intervals between every adjacent two of the touch motions; and adjusting at least one of the weights of touch motion modes corresponding to the executed application program according to whether each of the touch motions is a tap or a slide and each of the touch motions is a single-touch or a multi-touch, and according to the time intervals.

In accordance with one embodiment of the present invention, the weights of touch motion modes correspond to a plurality of predetermined configurations respectively. The step of adjusting at least one of the touch parameters according to the weights of touch motion modes corresponding to the executed application program includes searching the greatest weight of touch motion modes among the weights of touch motion modes corresponding to the executed application program, and adjusting at least one of the touch parameters according to one of the predetermined configurations corresponding to the greatest weight of touch motion modes among the weights of touch motion modes corresponding to the executed application program.

In accordance with one embodiment of the present invention, the operating method includes storing the weights of touch motion modes corresponding to the executed application program in the storage component, determining whether the application program that has started to be executed is being executed for the first time, loading the weights of touch motion modes corresponding to the application program that has started to be executed from the storage component when the application program started to be executed is not executed for the first time, and adjusting at least one of the touch parameters according to the loaded weights of touch motion modes.

In accordance with one embodiment of the present invention, the processing component is configured to execute a touch procedure. The weights of touch motion modes correspond to a plurality of loading levels. The operating method includes monitoring a utilization of the processing component, searching the greatest weight of touch motion modes among the weights of touch motion modes corresponding to the executed application program, and adjusting a priority of the touch procedure being executed by the processing component according to the utilization and according to one of the loading levels corresponding to the greatest weight of touch motion modes among the weights of touch motion modes corresponding to the executed application program.

In accordance with one embodiment of the present invention, the operating method includes outputting, through the touch component, the touch motions corresponding to the executed application program to the processing component according to a report rate; setting the report rate to a first report rate; determining whether a touch event occurs; counting a non-touch period when the touch event does not occur; and adjusting the report rate to a second report rate different from the first report rate when the non-touch period is smaller than a non-touch threshold.

Another aspect of the present invention is directed to a touch apparatus. In accordance with one embodiment of the present invention, the touch apparatus includes a storage component, a touch component, and a processing component. The storage component is configured to store at least one application program and a plurality of weights of touch motion modes corresponding to the application program. The weights of touch motion modes respectively correspond to a plurality of touch motion modes. The touch component is configured to receive and output a plurality of touch motions. The processing component is configured to determine whether execution of the application program has started. When execution of the application program has started, the processing component is configured to receive the touch motions outputted by the touch component, to adjust at least one of the weights of touch motion modes corresponding to the executed application program according to the touch motions, and to adjusting at least one of a plurality of touch parameters according to the weights of touch motion modes corresponding to the executed application program.

In accordance with one embodiment of the present invention, the processing component is further configured to determine whether each of the touch motions is a tap or a slide separately, to determine whether each of the touch motions is a single-touch or a multi-touch separately, to calculate a plurality of time intervals between every adjacent two of the touch motions, and to adjust at least one of the weights of touch motion modes corresponding to the executed application program according to whether each of the touch motions is a tap or a slide and each of the touch motions is a single-touch or a multi-touch, and according to the time intervals.

In accordance with one embodiment of the present invention, the weights of touch motion modes correspond to a plurality of predetermined configurations respectively. The processing component is further configured to search the greatest weight of touch motion modes among the weights of touch motion modes corresponding to the executed application program, and to adjust at least one of the touch parameters according to one of the predetermined configurations corresponding to the greatest weight of touch motion modes among the weights of touch motion modes corresponding to the executed application program.

In accordance with one embodiment of the present invention, the processing component is further configured to store the weights of touch motion modes corresponding to the executed application program in the storage component, to determine whether the application program that has started to be executed is being executed first time, to load the weights of touch motion modes corresponding to the application program that has started to be executed stored in the storage component when the application program that has started to be executed is not being executed for the first time, and to adjust at least one of the touch parameters according to the loaded weights of touch motion modes.

In accordance with one embodiment of the present invention, the weights of touch motion modes correspond to a plurality of loading levels. The processing component is further configured to execute a touch procedure, to monitor a utilization of the processing component itself, to search the greatest weight of touch motion modes among the weights of touch motion modes corresponding to the executed application program, and to adjust a priority of the touch procedure being executed by the processing component itself according to the utilization and according to one of the loading levels corresponding to the greatest weight of touch motion modes among the weights of touch motion modes corresponding to the executed application program.

In accordance with one embodiment of the present invention, the touch component is further configured to output the touch motions corresponding to the executed application program to the processing component according to a report rate, the processing component is further configured to set the report rate to a first report rate, to determine whether a touch event occurs, to count a non-touch period when the touch event does not occur, and to adjust the report rate to a second report rate different from the first report rate when the non-touch period is smaller than a non-touch threshold.

Thus, through application of one of the embodiments mentioned above, during a period the application is executed, the touch device can acquire the weights of touch motion modes corresponding to the application according to the received touch motions. Accordingly, the touch device can acknowledge the performance requirements corresponding to the application, and base on which to adjust the touch parameters. In such a manner, the dilemma between the performance and the power consumption rate of the touch component can be solved.

In addition, through application of another one of the embodiments mentioned above, the touch device can monitor the utilization of the processing component. By doing so, when the utilization of the processing component is high and an application with high performance requirement is executed, the priority of touch service performed by the processing component can be increased. In such a manner, a lengthy response time of the touch events can be avoided while the loading of the processing component is heavy.

Moreover, through application of still another one of the embodiments mentioned above, the touch device can detect the touch events, so as to decrease the touch report rate used in software while the touch events are not detected, such that the power consumption rate of the touch device can be decreased step by step along with the increase of the non-touch period.

BRIEF DESCRIPTION OF THE DRAWINGS

The invention can be more fully understood by reading the following detailed description of the embodiment, with reference made to the accompanying drawings as follows:

FIG. 2 is a diagram illustrating the relationship among weights of touch motion modes, application programs, touch motion modes, and loading levels in accordance with one embodiment of the present disclosure;

DETAILED DESCRIPTION

Figure 1:
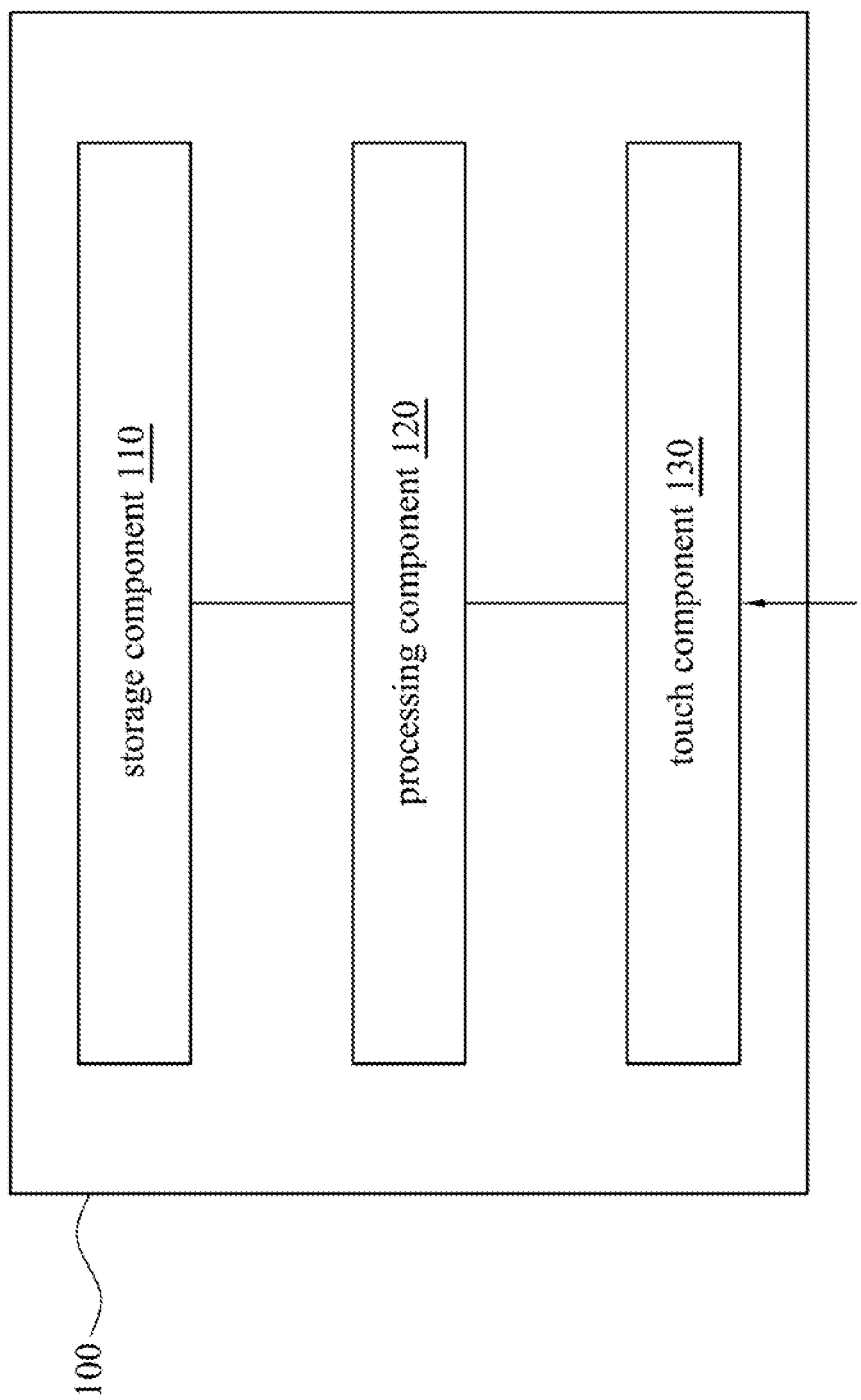
FIG. 1 is a schematic diagram of a touch apparatus in accordance with one embodiment of the present disclosure.

In the following detailed description, for purposes of explanation, numerous specific details are set forth in order to attain a thorough understanding of the disclosed embodiments. It will be apparent, however, that one or more embodiments may be practiced without these specific details. In other instances, well-known structures and devices are schematically shown in order to simplify the drawing.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims herein is not intended to invoke the provisions of 35 U.S.C. §112, 6th paragraph.

One aspect of the present invention is a touch device.

FIG. 1 is a schematic diagram of the touch apparatus 100 in accordance with one embodiment of the present disclosure. The touch apparatus 100 for example can be a smartphone, a tablet computer, or another apparatus capable of displaying and being controlled by touches (e.g., a tap or a slide) made by a user. The touch device 100 includes a storage component 110, a processing component 120, and a touch component 130.

The storage component 110 can be realized by any type of storage device, such as a disk, a memory card, or a memory. The storage component 110 can be configured to store a plurality of application programs (e.g., messaging application programs, games, and picture viewers), a plurality of weights of touch motion modes separately corresponding to the application programs, and a plurality of touch motion modes separately corresponding to the application programs. The weights of touch motion modes separately correspond to the touch motion modes. The touch motion modes for example can include a low-frequency single-tap mode, a low-frequency single-slide mode, a low-frequency multi-slide mode, and a high-frequency multi-slide mode. However, it should be noted that touch motion modes are not limited to the aspects described above.

The touch motion mode can respectively correspond to the loading levels. For example, due to the fact that a utilization (e.g., CPU utilization) of the processing component 120 is low at the low-frequency single-tap mode, the low-frequency single-slide mode corresponds to a low loading level (e.g., loading level 1). On the other hand, due to the fact that the utilization of the processing component 120 is high at the high-frequency multi-slide mode, the low-frequency single-slide mode corresponds to a high loading level (e.g., loading level 10). In addition, the weights of touch motion modes corresponding to one of the application programs stored in the storage component 110 can respectively correspond to different loading levels.

The touch component 130 can be realized by any type of touch device, such as a touch sensor plate, or a touch display panel which can display images. The touch component 130 can be configured to receive touch motions made and inputted by the user according to a plurality of touch parameters, and to output signals corresponding to the received touch motions to the processing component 120 according to a report rate. The report rate for example can be the frequency that the touch component 130 transmits signals corresponding to the received touch motions to the processing component 120. In some embodiments, by adjusting the touch parameters, the performance and the power consumption rate of the touch component 130 can also be adjusted. The touch parameters, for example, can include all of or part of a parameter of hardware sensor scan rate, a parameter of hardware sensor repeat time, a parameter of hardware touch threshold, a parameter of hardware touch low pass filter, and a parameter of hardware touch wait time to idle. The parameter of hardware sensor scan rate corresponds to a time interval that the touch component 130 requests data from a touch sensor (not shown). The parameter of hardware sensor repeat time corresponds to the frequency that the touch sensor performs a scan. The parameter of hardware touch threshold corresponds to the sensibility of the touch sensor in respect to a touch, and prevents unnecessary power consumption of the system when the sensibility is overly high. The parameter of hardware touch low pass filter is used to adjust a range of valid touch area of the touch sensor, that is, at what size of the contact area of a touch the touch sensor will be stimulated. The parameter of hardware touch wait time to idle corresponds to the time period before the touch sensor enters the idle state when the touch sensor does not receive any touch.

The processing component 120 can be realized by any type of processing device, such as a central processor or a microprocessor. The processing component 120 can be configured to execute one of the application programs stored in the storage component 110 and further to determine whether execution of any one of the application programs stored in the storage component 110 has started. In one embodiment, these tasks can be performed through different procedures. When execution of one of the application programs stored in the storage component 110 has started, the processing component 120 can load a predetermined touch motion mode or a previously stored touch motion mode, and adjust at least one of the touch parameters according to the loaded touch motion mode. Subsequently, the processing component 120 can receive a plurality of signals corresponding to touch motions, in which the touch motions are made and inputted by the user and in which the touch motions correspond to the executed application program, through the touch component 130. The processing component 120 may then analyze the received signals corresponding to the touch motions, and adjust at least one of the weights of touch motion modes corresponding to the executed application program according to the touch motions. Next, the processing component 120 can dynamically adjust at least one of the touch parameters according to the weights of touch motion modes corresponding to the executed application program.

For example, referring to FIG. 2, in one embodiment, the storage component 110 can separately store weights of touch motion modes W100, W101, . . . , W110 corresponding to an application program APP1 (e.g., a messaging application program), weights of touch motion modes W200, W201, . . . , W210 corresponding to an application program APP2 (e.g., a game), and weights of touch motion modes W300, W301, . . . , W310 corresponding to an application program APP3 (e.g., a picture viewer). When execution of the application program APP3 is started, the processing component 120 for example can load a predetermined touch motion mode or a previously stored touch motion mode, such as a low-frequency single-tap mode, and adjust at least one of the touch parameters according to the low-frequency single-tap mode. Subsequently, the processing component 120 can receive a plurality of signals corresponding to touch motions which, in turn, correspond to the application program APP3 through the touch component 130. At this time, if the touch motions corresponding to the application program APP3 correspond to (or belong to) the low-frequency multi-slide mode (e.g., the touch motions may be used to zoom in/out an image) and the low-frequency single-tap mode (e.g., the touch motions may be used to open an image file), then the processing component 120 can correspondingly adjust the weight W309 corresponding to the low-frequency multi-slide mode and the weight W301 corresponding to the low-frequency single-tap mode.

For example, the processing component 120 can increase the weight W301 corresponding to the low-frequency single-tap mode at the receipt of a touch motion corresponding to (or belonging to) the low-frequency single-tap mode. Subsequently, the processing component 120 can dynamically adjust at least one of the touch parameters according to the weights of touch motion modes W300, W301, ..., W310 corresponding to the application program APP3. For example, the processing component 120 can increase the parameter of hardware sensor scan rate.

During such operation, when the application programs APP1-APP3 are executed, the processing component 120 can acknowledge the user's behaviors (e.g., the processing component 120 can acknowledge the fact that the touch motions, which are inputted by the user, incline to which one of the touch motion modes during the operations of the application programs APP1-APP3), and acknowledge the requirements of the touch parameters accordingly. In such a way, the processing component 120 can dynamically adjust the touch parameters according to the requirements of different users operating different application programs, so as to dynamically adjust the performance and the power consumption rate of the touch component 130, such that the problem of a trade-off between the performance and the power consumption rate of the touch component 130 can be solved.

For example, when the application program APP2 (e.g., a game) is executed, the touch motions made and inputted by the user mostly correspond to the high-frequency multi-slide mode. At this time, the performance requirement of the touch component 130 is higher, so the processing component 120 can adjust the touch parameters to increase the performance and the power consumption rate of the touch component 130. When the application program APP1 (e.g., messaging application program) is executed, the touch motions inputted by the user mostly correspond to single-taps. At this time, the performance requirement of the touch component 130 is lower, so the processing component 120 can adjust the touch parameters to decrease the performance and the power consumption rate of the touch component 130.

In addition, when a young user operates the application program APP2 (e.g., game), most of the touch motions inputted by the young user typically correspond to the high-frequency multi-slide mode. At this time, the performance requirement of the touch component 130 is higher, so the processing component 120 can adjust the touch parameters to increase the performance and the power consumption rate of the touch component 130. On the other hand, when an older user operates the application program APP2 (e.g., game), most of the touch motions inputted by the older user typically correspond to single-slides. At this time, the performance requirement of the touch component 130 is lower, so the processing component 120 can adjust the touch parameters to decrease the performance and the power consumption rate of the touch component 130.

In one embodiment, the processing component 120 can periodically (e.g., every predetermined period (e.g., 10 seconds)) adjust the touch parameters according to the weights of touch motion modes corresponding to the executed application program. That is, the processing component 120 can continuously receive and analyze signals corresponding to touch motions, and continuously adjust the weights of touch motion modes corresponding to the executed application program according to the touch motions, and adjust the touch parameters corresponding to the weights of touch motion modes every period (e.g., every 10 seconds). In another embodiment, the user can selectively determine whether to make the processing component 120 periodically (e.g., every another predetermined period (e.g., 30 seconds)) reset the weights of touch motion modes corresponding to the executed application program to initial values (e.g., zeros).

With such operation, when one of the application programs is executed, if the user of the touch apparatus 100 is changed from a young user to an older user, and the performance requirement of the touch component 130 is accordingly decreased, then after the plurality of weights of touch motion modes corresponding to the executed application program are reset to the initial values, the processing component 120 can rapidly adjust the touch parameters and adjust (e.g., decrease) the performance and the power consumption rate of the touch component to adapt to the behaviors of the older user.

In one embodiment, the processing component 120 only receives the touch motions and adjusts the touch weights of touch motion modes and the touch parameters when one of the application programs stored in the storage component 110 is executed. That is, if none of the application programs stored in the storage component 110 are being executed, then the processing component 120 stops receiving the touch motions and stops adjusting the touch weights of touch motion modes and the touch parameters.

In one embodiment of the invention, the processing component 120 can be configured to determine whether each of the touch motions corresponding to the executed application program is a tap or a slide, to determine whether each of the touch motions corresponding to the executed application program is a single-touch or a multi-touch, and to calculate a plurality of time intervals between every adjacent two of the touch motions corresponding to the executed application program, in which every adjacent two of the touch motions, for example, can be an $n^{th}$ received touch motion and an $n-1^{th}$ received touch motion. Subsequently, the processing component 120 can adjust at least one of the weights of touch motion modes corresponding to the executed application program according to the fact that each of the touch motions is a tap or a slide and each of the touch motions is a single-touch or a multi-touch, and according to the time intervals. For example, in the case where a first touch motion is determined to be a slide and a multi-touch, if the time interval between the first touch motion and a previous touch motion is shorter than a predetermined time interval (e.g. 1 second), then the processing component 120 can adjust (e.g., increase) the weight corresponding to the executed application program and corresponding to the high-frequency multi-slide mode (e.g., the adjusted weight can be the weight W110, W210, or W310).

In one embodiment of the present invention, the processing component 120 can be configured to store the weights of touch motion modes corresponding to the executed application program in the storage component 110. When execution of one of the application programs stored in the storage component 110 is started, the processing component 120 can determine whether such an application program is being executed for the first time. If not, the processing component 120 can be configured to load the weights of touch motion modes corresponding to such an application program from the storage component 110, and to adjust at least one of the touch parameters according to the loaded weights of touch motion modes.

With such operation, the processing component 120 can store the weights of touch motion modes corresponding to the executed application program in the storage component 110, and adjust the touch parameters according to the stored weights of touch motion modes the next time the same application program is executed.

In one embodiment of the present invention, the touch motion modes correspond to different predetermined configurations respectively. The predetermined configurations can separately be different assemblies containing the touch parameters with different values, and, for example, can be separately stored in different configuration files in the storage component 110. For example, in one of the predetermined configurations corresponding to the low-frequency single-tap mode, the parameter of hardware sensor scan rate can be a first value, the parameter of hardware sensor repeat time can be a second value, and the parameter of hardware touch threshold can be a third value. In another one of the predetermined configurations corresponding to the high-frequency multi-slide mode, the parameter of hardware sensor scan rate can be a fourth value, the parameter of hardware sensor repeat time can be a fifth value, and the parameter of hardware touch threshold can be a sixth value.

In this embodiment, the processing component 120 can be configured to search the greatest weight of touch motion modes among the weights of touch motion modes (e.g., W201-W210) corresponding to the executed application program (e.g., APP2). The greatest weight of touch motion modes, for example, can be one of the weights of touch motion modes corresponding to the executed application program with greatest value. The processing component can be configured to adjust at least one of the touch parameters according to one of the predetermined configurations corresponding to the greatest weight of touch motion modes among the weights of touch motion modes corresponding to the executed application program.

In one embodiment of the present invention, the processing component 120 is configured to execute a touch procedure, so as to process the touch events (e.g., to analyze the touch event and to change the displayed image in response). In addition, the processing component 120 can monitor the utilization of the processing component 120 itself (e.g., via a monitoring procedure) and to search the greatest weight of touch motion modes among the weights of touch motion modes corresponding to the executed application program. The processing component 120 can then adjust a priority of the touch procedure being executed by the processing component 120 according to the utilization and one of the loading levels corresponding to the greatest weight of touch motion modes among the weights of touch motion modes corresponding to the executed application program.

For example, in the case where the utilization of the processing component 120 is higher than a utilization threshold (e.g. 50%), if the loading level (e.g., level 10) corresponding to the greatest weight of touch motion modes (e.g., W210) among the weights of touch motion modes (e.g., W201-W210) corresponding to the executed application program (e.g., APP2) is greater than a loading level threshold (e.g., level 5), then the processing component 120 can increase the priority of the touch procedure being executed by the processing component 120 itself. In such a manner, when the loading of the processing component 120 is increased, the priority of the touch procedure can also be increased, such that a lengthy response time of the touch events can be avoided.

It should be noted that, in this embodiment, the touch events mentioned above occur at the time that the touch component 130 receives touches (the touches may be made and inputted by the user or other object). On the other hand, the touch motions mentioned in the above paragraphs are related to the touches corresponding to the executed application program. The touch events can include, but is not limited to, the touch motions.

In one embodiment of the present invention, after the touch apparatus is started, the processing component 120 can be configured to set the report rate of the touch component 130 to a first report rate (e.g., 200 Hz). Moreover, the processing component 120 can determine whether any touch event occurs during a period that execution of none of the application programs stored in the storage component 110 is started. If a touch event does not occur, the processing component 120 can count a non-touch period, and decrease the report rate of the touch component 130 in a manner corresponding to any increase in the non-touch period. For example, the processing component 120 can set the report rate of the touch component 130 to a second report rate (e.g., 160 Hz) when the non-touch period is smaller than a first non-touch threshold (e.g., 10 seconds), set the report rate of the touch component 130 to a second report rate (e.g., 120 Hz) when the non-touch period is greater than the first non-touch threshold and smaller than a second non-touch threshold (e.g., 20 seconds), and so on. In addition, the non-touch period can be set to zero when a touch event occurs. That is, when a touch event occurs, the non-touch period counted by the processing component can be reset.

In the above-mentioned operation, the power consumption rate of the touch apparatus can be decreased in a manner corresponding to an increase in the non-touch period.

Another aspect of the present invention is an operating method for dynamically adjusting a plurality of touch parameters of a touch apparatus.

Figure 3:
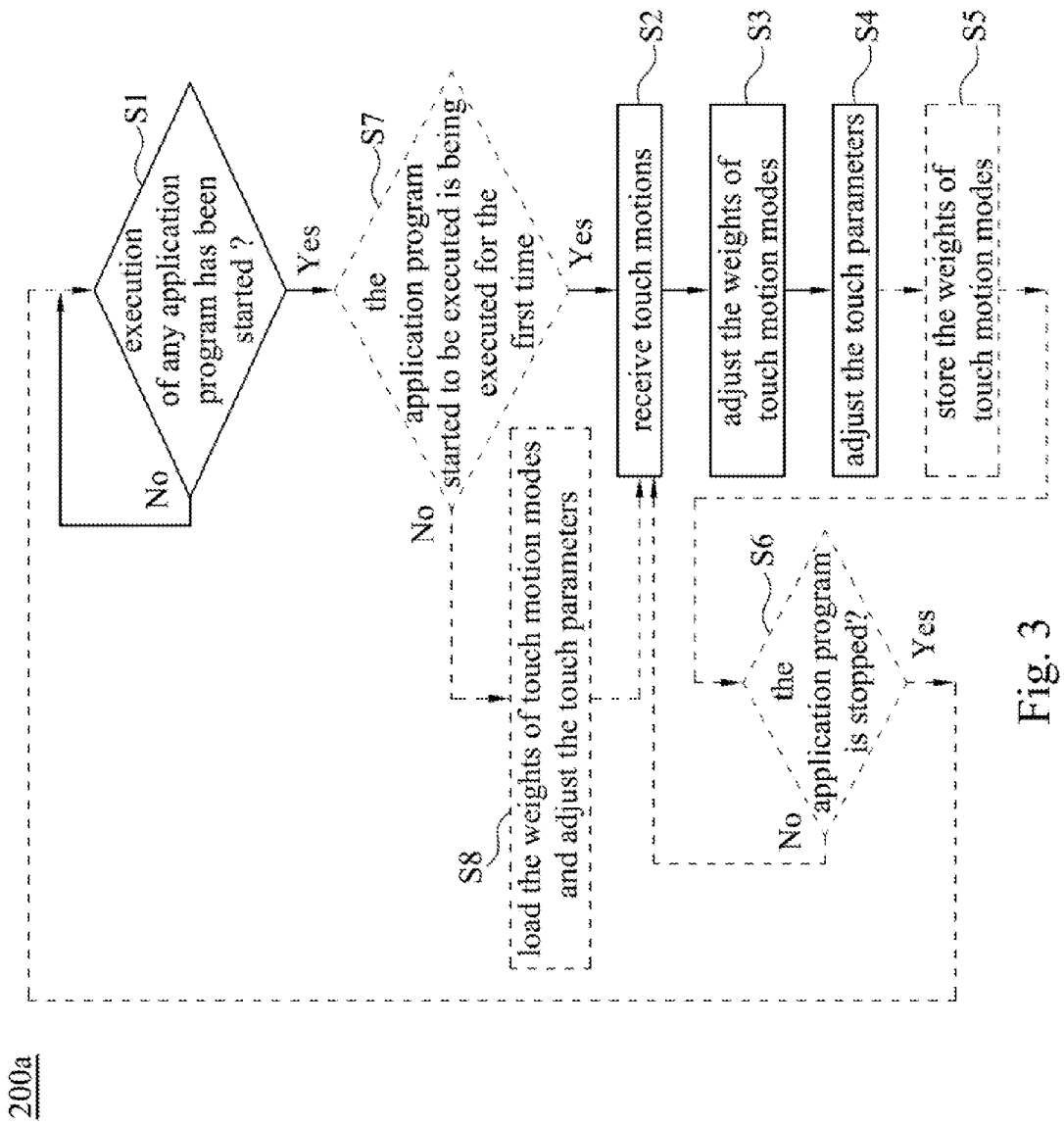
FIG. 3 is a flowchart illustrating an operating method applied to the touch apparatus in accordance with one embodiment of the present disclosure.

FIG. 3 is a flowchart illustrating an operating method 200*a* applied to a touch apparatus in accordance with one embodiment of the present disclosure. The operating method 200*a* can be applied to a touch apparatus having a structure that is the same as or similar to the structure shown in FIG. 1. To simplify the description below, in the following paragraphs, the embodiment shown in FIG. 1 will be used as an example to describe the operating method 200*a* according to embodiments of the present disclosure. However, the invention is not limited to application to the embodiment shown in FIG. 1.

Reference is now made to FIG. 1-FIG. 3. In one embodiment, the operating method 200*a* can include the steps as outlined below.

Step S1: The processing component 120 determines whether execution of any of the application programs (e.g., application program APP1, application program APP2, or application program APP3) stored in the storage component 110 has been started. If so, step 32 is executed. Otherwise, step S1 is repeated.

Step S2: The processing component 120 receives a plurality of signals corresponding to touch motions corresponding to the executed application program according to the touch parameters.

Step S3: After step 32, the processing component 120 adjusts at least one of the weights of touch motion modes (e.g., weight W100, W101, . . . , or W310) corresponding to the executed application program according to the received touch motions.

Step S4: Subsequent to step S3, the processing component 120 adjusts at least one of the touch parameters according to the weights of touch motion modes corresponding to the executed application program.

In this embodiment, details of the storage component 110, processing component 120, touch component 130, application programs, weights of touch motion modes, and touch parameters can be ascertained by referring to the explanations given above, and a description in this regard will not be repeated herein.

During such operation, when the application programs (e.g., applications APP1-APP3) stored in the storage component 110 are executed, the processing component 120 can acknowledge the user's behaviors and the performance requirement of the touch component 130 according to the weights of touch motion modes (e.g., W100, W101, . . . , W310) corresponding to the executed application programs separately. In such a way, the processing component 120 can dynamically adjust the touch parameters according to the requirements of different users operating different application programs, such that the problem of the trade-off between the performance and the power consumption rate of the touch component 130 can be solved.

In one embodiment, step S3, for example, can include a number of steps. In particular, in such an embodiment, the processing component 120 determines whether each of the touch motions is a tap or a slide. Moreover, the processing component 120 determines whether each of the touch motions is a single-touch or a multi-touch. Also, the processing component 120 calculates a plurality of time intervals between every adjacent two of the touch motions. Finally, the processing component 120 adjusts at least one of the weights of touch motion modes corresponding to the executed application program according to the fact that each of the touch motions is a tap or a slide and each of the touch motions is a single-touch or a multi-touch, and according to the time intervals.

Every adjacent two of the touch motions may be referred to by stating, for example, an $n^{th}$ received touch motion and an $n-1^{th}$ received touch motion.

In the case where a first touch motion is determined to be a slide and a multi-touch, if the time interval between the first touch motion and a previous touch motion is shorter than a predetermined time interval (e.g., 1 second), then the processing component 120 can adjust (e.g., increase) the weight corresponding to the executed application program and corresponding to the high-frequency multi-slide mode (e.g., the adjusted weight can be the weight W110, W210, or W310).

In one embodiment, the step S4, for example, can include a number of steps. In particular, the processing component 120 searches the greatest weight of touch motion modes among the weights of touch motion modes corresponding to the executed application program. The processing component 120 adjusts at least one of the touch parameters according to one of the predetermined configurations corresponding to the greatest weight of touch motion modes among the weights of touch motion modes corresponding to the executed application program.

In one embodiment, the operating method 200a, for example, can periodically (e.g., every predetermined period (e.g., 10 seconds)) adjust the touch parameters according to the weights of touch motion modes corresponding to the executed application program through the processing component 120. That is, the processing component 120 can continuously receive and analyze signals corresponding to touch motions, and continuously adjust the weights of touch motion modes corresponding to the executed application program according to the touch motions, and adjust the touch parameters according to the weights of touch motion modes every period (e.g., every 10 seconds). In one embodiment, the user can selectively determine whether to make the processing component 120 periodically (e.g., every another predetermined period (e.g., 30 seconds)) reset the touch parameters corresponding to the executed application program to initial values (e.g., zeros).

With such operation, when one of the application programs is executed, if the user of the touch apparatus 100 is changed from a young user to an older user, and the performance requirement of the touch component 130 is accordingly decreased, then after the plurality of weights of touch motion modes corresponding to the executed application program are reset to the initial values, the processing component 120 can rapidly adjust the touch parameters and adjust (e.g., decrease) the performance and the power consumption rate of the touch component 130 to adapt to the behaviors of the older user.

In one embodiment, the operating method 200a can further include a number of steps as outlined below.

Step S5: After step S4, the processing component 120 stores the weights of touch motion modes corresponding to the executed application program in the storage component 110.

Step S6: Subsequent to step S5, the processing component 120 determines whether the application program stops. If so, the routine returns back to step S1. Otherwise, the routine returns back to step S2.

Step S7: Between step S1 and step S2, the processing component 120 determines whether the application program started to be executed is being executed for the first time. If so, step S2 is executed. Otherwise, step S8 is executed.

Step S8: The processing component 120 loads the weights of touch motion modes corresponding to the application program started to be executed from the storage component 110 and adjusts at least one of the touch parameters according to the loaded weights of touch motion modes. Next, step S2 is executed.

It should be noted that, in this embodiment, the order of steps S4 and S5 may be changed.

In such a manner, the processing component 120 can store the weights of touch motion modes corresponding to the executed application program in the storage component 110, and adjust the touch parameters according to the stored weights of touch motion modes while executing the same application program the next time.

In addition, in this embodiment, the processing component 120 only receives the touch motions and adjusts the touch weights of touch motion modes and the touch parameters when one of the application programs stored in the storage component 110 is being executed. That is, if none of the application programs stored in the storage component 110 is being executed, then the processing component 120 stops receiving the touch motions and stops adjusting the touch weights of touch motion modes and the touch parameters.

Figure 4:
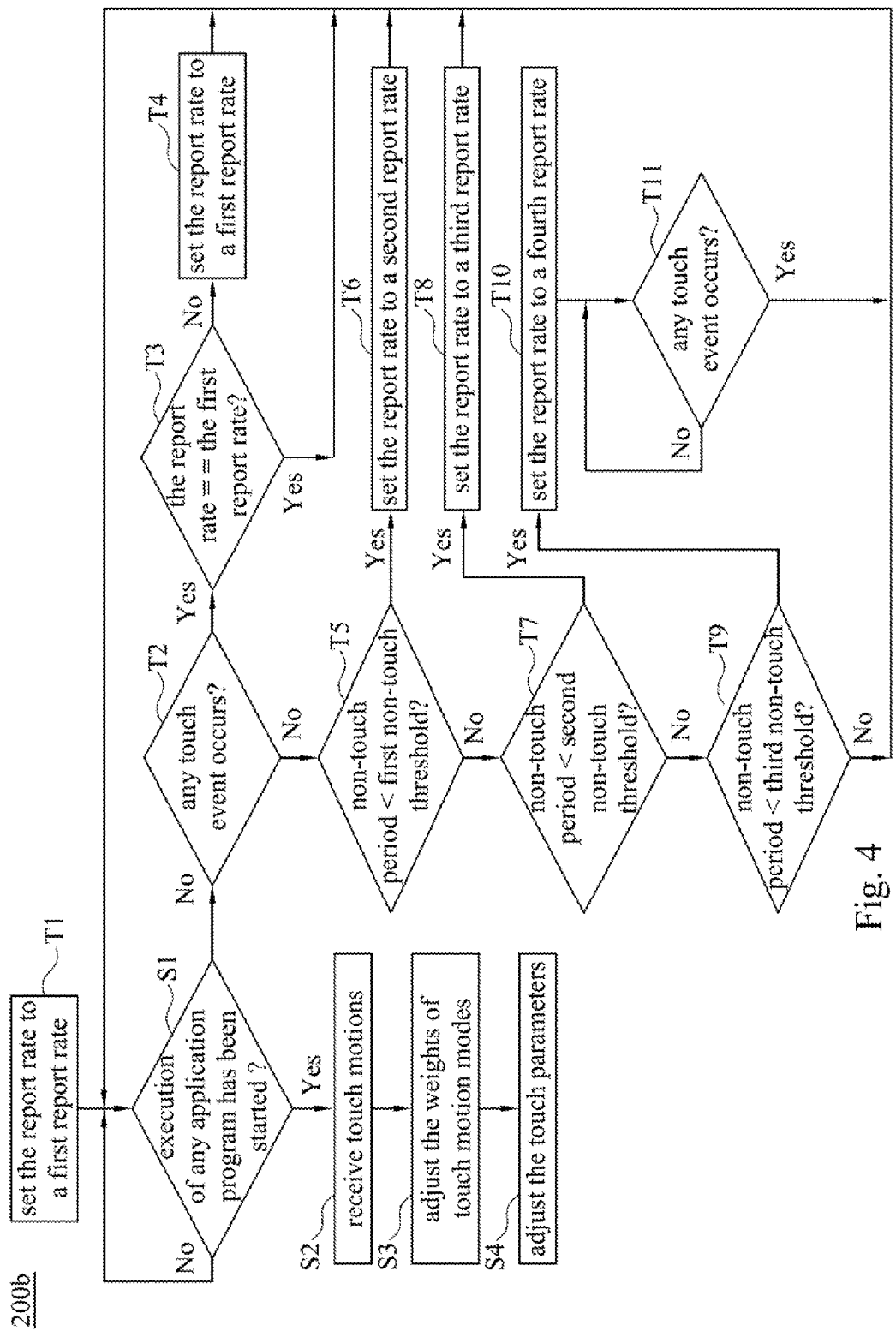
FIG. 4 is a flowchart illustrating an operating method applied to the touch apparatus in accordance with another embodiment of the present disclosure.

FIG. 4 is a flowchart illustrating an operating method 200b applied to the touch apparatus in accordance with another embodiment of the present disclosure. In this embodiment the operating method 200b can include the aforementioned steps S1-S4 and steps T1-T11. To simplify the description below, the above paragraphs can be referenced for a description of steps S1-S4, and thus an explanation in this regard will not be repeated herein. Only steps T1-T11 will be described below.

Step T1: The processing component 120 sets the report rate of the touch component 130 to a first report rate (e.g., 200 Hz). Next, step S1 is executed. In step S1, if the processing component 120 determines that execution of none of the application programs stored in the storage component 110 is started, then step S1 is repeated and step T2 is executed (e.g., by different procedures).

Step T2: The processing component 120 determines whether any touch event occurs. If so, step T3 is executed. Otherwise, the processing component 120 counts a non-touch period, and step T5 is executed.

Step T3: The processing component 120 determines whether the report rate of the touch component 130 is equal to the first report rate. If so, the routine returns back to step S1. Otherwise, step T4 is executed.

Step T4: The processing component 120 sets the report rate of the touch component 130 to a first report rate. Subsequently, the routine returns back to step S1.

Step T5: The processing component 120 determines whether the non-touch period is smaller than a first non-touch threshold (e.g., 10 seconds). If so, step T6 is executed. Otherwise, step T7 is executed.

Step T6: The processing component 120 can set the report rate of the touch component 130 to a second report rate (e.g., 160 Hz). Subsequently, the routine returns back to step S1.

Step T7: The processing component 120 determines whether the non-touch period is smaller than a second non-touch threshold (e.g., 20 seconds). If so, this indicates that the non-touch period is greater than the first non-touch threshold and smaller than the second non-touch threshold, and step T8 is executed. Otherwise, step T9 is executed.

Step T8: The processing component 120 sets the report rate of the touch component 130 to a third report rate (e.g., 120 Hz). Subsequently, the routine returns back to step S1.

Step T9: The processing component 120 determines whether the non-touch period is smaller than a third non-touch threshold (e.g., 30 seconds). If so, this indicates that the non-touch period is greater than the second non-touch threshold and smaller than the third non-touch threshold, and step T10 is executed. Otherwise, step S1 is executed.

Step T10: The processing component 120 sets the report rate of the touch component 130 to a fourth report rate (e.g., 80 Hz).

Step T11: After step T10, the processing component 120 determines whether any touch event occurs. If so, the routine returns back to step S1. Otherwise, step T11 is repeated.

In this embodiment steps T5-T8 can be selectively omitted. In this embodiment, the non-touch period can be set to zero while a touch event occurs. That is, when a touch event occurs, the non-touch period counted by the processing component 120 can be reset. Details with respect to the report rate and the touch event can be ascertained by referring to the previous embodiment, and a description in this regard will not be repeated herein.

In the configuration mentioned above, the power consumption rate of the touch apparatus 100 can be decreased as the non-touch period is increased.

In one embodiment, the touch motion modes correspond to different predetermined configurations respectively. The predetermined configurations can separately be different assemblies containing touch parameters with different values, and, for example, can be stored in different configuration files in the storage component 110.

In this embodiment, the operating methods 200a, 200b can, for example through the processing component 120, search the greatest weight of touch motion modes among the weights of touch motion modes (e.g., W201-W210) corresponding to the executed application program (e.g., APP2). Subsequently, the processing component can adjust at least one of the touch parameters according to one of the predetermined configurations corresponding to the greatest weight of touch motion modes among the weights of touch motion modes corresponding to the executed application program.

In one embodiment, the operating methods 200a, 200b can, for example through the processing component 120, execute touch procedures so as to process the touch events (e.g., to analyze the touch events and change the displayed image in response).

Figure 5:
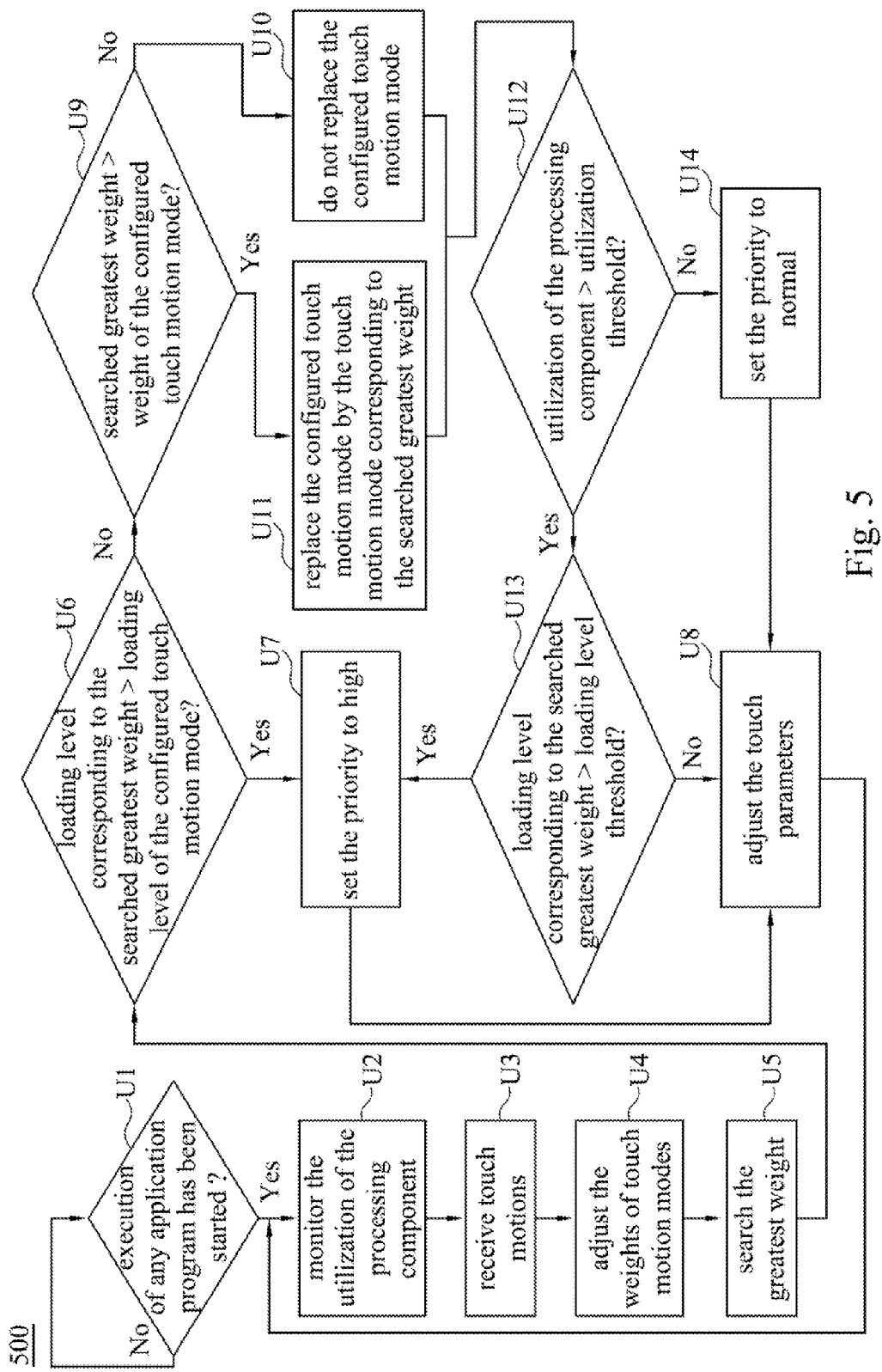
FIG. 5 is a flowchart illustrating an operating method applied to the touch apparatus in accordance with still another embodiment of the present disclosure.

FIG. 5 is a flowchart illustrating an operating method 500 applied to the touch apparatus in accordance with still another embodiment of the present disclosure.

In this embodiment, the operating method 500 includes the steps as outlined below.

Step U1: The processing component 120 determines whether execution of any of the application programs (e.g., application program APP1, application program APP2, or application program APP3) stored in the storage component 110 has started. If so, step U2 is executed. Otherwise, step U1 is repeated.

Step U2: The processing component 120 monitors the utilization of the processing component 120 itself.

Step U3: After step U2, the processing component 120 receives a plurality of signals corresponding to touch motions, which are made and inputted by the user, in which the touch motions correspond to the executed application program and correspond to the touch parameters.

Step U4: Following step U3, the processing component 120 adjusts at least one of the weights of touch motion modes (e.g., weight W100, W101, . . . , or W310) corresponding to the executed application program according to the received touch motions.

Step U5: Subsequent to step U4, the processing component 120 searches the greatest weight of touch motion modes among the weights of touch motion modes corresponding to the executed application program.

Step U6: After step U5, the processing component 120 determines whether the loading level corresponding to the searched greatest weight of touch motion modes is greater than a loading level, corresponding to a configured touch motion mode. If so, step U7 is executed. Otherwise, step U9 is executed.

Step U7: After step U6 or U13, the processing component 120 sets the priority of the touch procedure executed by the processing component 120 itself to high.

Step U8: Following step U7, U13, or U14, the processing component 120 adjusts the touch parameters according to a predetermined configuration (e.g., a configuration file) according to the configured touch motion mode or according to a predetermined configuration corresponding to the touch motion mode having the searched greatest weight of touch motion modes.

Step U9: Subsequent to step U6, the processing component 120 determines whether the searched greatest weight of touch motion modes is greater than the weight of the configured touch motion mode. If so, step U11 is executed. Otherwise, step U10 is executed.

Step U10: After step U9, the processing component 120 does not replace the configured touch motion mode by the touch motion mode corresponding to the searched greatest weight of touch motion modes, and that is, in step U8, the processing component 120 will adjust the touch parameters according to the predetermined configuration corresponding to the configured touch motion mode.

Step U11: Following step U9, the processing component 120 replaces the configured touch motion mode by the touch motion mode corresponding to the searched greatest weight of touch motion modes, and that is, in step U8, the processing component 120 will adjust the touch parameters according to the predetermined configuration corresponding to the touch motion mode having the searched greatest weight of touch motion modes.

Step U12: After step U10 or U11, the processing component 120 determines whether the utilization of the processing component itself is greater than a utilization threshold (e.g., 50%). If so, step U13 is executed. Otherwise, step U14 is executed.

Step U13: Subsequent to step U12, the processing component 120 determines whether the loading level corresponding to the searched greatest weight of touchmotion modes is greater than a loading level threshold (e.g., level 5). If so, step U7 is executed. Otherwise, step U8 is executed.

Step U14: After step U12, the processing component 120 sets the priority of the touch procedure executed by the processing component 120 itself to normal.

In such a manner, when the loading of the processing component 120 is increased, the priority of the touch procedure can also be increased, such that a lengthy response time of the touch events can be avoided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An operating method for dynamically adjusting a plurality of touch parameters of a touch apparatus, wherein the touch apparatus comprises a storage component, a touch component, and a processing component, the storage component is configured to store at least one application program, a plurality of weights of touch motion modes corresponding to the application program, and a plurality of touch motion modes corresponding to the application program, and the weights of touch motion modes respectively correspond to the touch motion modes, the operating method comprising:
   determining whether execution of the application program has started;
   receiving, through the touch component, a plurality of touch motions corresponding to the executed application program when execution of the application program has started;
   adjusting at least one of the weights of touch motion modes corresponding to the executed application program according to the touch motions; and
   dynamically adjusting at least one of the touch parameters according to the weights of touch motion modes corresponding to the executed application program.

2. The operating method as claimed in claim 1, wherein the step of adjusting at least one of the weights of touch motion modes corresponding to the executed application program according to the touch motions comprises:
   determining whether each of the touch motions is a tap or a slide separately;
   determining whether each of the touch motions is a single-touch or a multi-touch separately;
   calculating a plurality of time intervals between every adjacent two of the touch motions; and
   adjusting at least one of the weights of touch motion modes corresponding to the executed application program according to whether each of the touch motions is a tap or a slide and each of the touch motions is a single-touch or a multi-touch, and according to the time intervals.

3. The operating method as claimed in claim 1, wherein the weights of touch motion modes correspond to a plurality of predetermined configurations respectively, and the step of adjusting at least one of the touch parameters according to the weights of touch motion modes corresponding to the executed application program comprises:
   searching the greatest weight of touch motion modes among the weights of touch motion modes corresponding to the executed application program; and
   adjusting at least one of the touch parameters according to one of the predetermined configurations corresponding to the greatest weight of touch motion modes among the weights of touch motion modes corresponding to the executed application program.

4. The operating method as claimed in claim 1, further comprising:
   storing the weights of touch motion modes corresponding to the executed application program in the storage component;
   determining whether the application program that has started to be executed is being executed for the first time;
   loading the weights of touch motion modes corresponding to the application program that has started to be executed from the storage component when the application program that has started to be executed is not executed for the first time; and
   adjusting at least one of the touch parameters according to the loaded weights of touch motion modes.

5. The operating method as claimed in claim 1, wherein the processing component is configured to execute a touch procedure, and the weights of touch motion modes correspond to a plurality of loading levels, the operating method further comprising:
   monitoring a utilization of the processing component;
   searching the greatest weight of touch motion modes among the weights of touch motion modes corresponding to the executed application program; and
   adjusting a priority of the touch procedure being executed by the processing component according to the utilization and according to one of the loading levels corresponding to the greatest weight of touch motion modes among the weights of touch motion modes corresponding to the executed application program.

6. The operating method as claimed in claim 1, further comprising:
   outputting, through the touch component, the touch motions corresponding to the executed application program to the processing component according to a report rate;
   setting the report rate to a first report rate;
   determining whether a touch event occurs;
   counting a non-touch period when the touch event does not occur; and
   adjusting the report rate to a second report rate different from the first report rate when the non-touch period is smaller than a non-touch threshold.

7. A touch apparatus comprising:
   a storage component configured to store at least one application program and a plurality of weights of touch motion modes corresponding to the application program, wherein the weights of touch motion modes respectively correspond to a plurality of touch motion modes;
   a touch component configured to receive and output a plurality of touch motions; and
   a processing component configured to determine whether execution of the application program has started, wherein when execution of the application program has started, the processing component is configured to receive the touch motions outputted by the touch component, to adjust at least one of the weights of touch motion modes corresponding to the executed application program according to the touch motions, and to adjust at least one of a plurality of touch parameters according to the weights of touch motion modes corresponding to the executed application program.

8. The touch apparatus as claimed in claim 7, wherein the processing component is further configured to determine whether each of the touch motions is a tap or a slide separately, to determine whether each of the touch motions is a single-touch or a multi-touch separately, to calculate a plurality of time intervals between every adjacent two of the touch motions, and to adjust at least one of the weights of touch motion modes corresponding to the executed application program according to whether each of the touch motions is a tap or a slide and each of the touch motions is a single-touch or a multi-touch, and according to the time intervals.

9. The touch apparatus as claimed in claim 7, wherein the weights of touch motion modes correspond to a plurality of predetermined configurations respectively, and the processing component is further configured to search the greatest weight of touch motion modes among the weights of touch motion modes corresponding to the executed application program, and to adjust at least one of the touch parameters according to one of the predetermined configurations corresponding to the greatest weight of touch motion modes among the weights of touch motion modes corresponding to the executed application program.

10. The touch apparatus as claimed in claim 7, wherein the processing component is further configured to store the weights of touch motion modes corresponding to the executed application program in the storage component, to determine whether the application program that has started to be executed is being executed for the first time, to load the weights of touch motion modes corresponding to the application program that has started to be executed stored in the storage component when the application program that has started to be executed is not being executed for the first time, and to adjust at least one of the touch parameters according to the loaded weights of touch motion modes.

11. The touch apparatus as claimed in claim 7, wherein the weights of touch motion modes correspond to a plurality of loading levels, and the processing component is further configured to execute a touch procedure, to monitor a utilization of the processing component itself, to search the greatest weight of touch motion modes among the weights of touch motion modes corresponding to the executed application program, and to adjust a priority of the touch procedure being executed by the processing component itself according to the utilization and according to one of the loading levels corresponding to the greatest weight of touch motion modes among the weights of touch motion modes corresponding to the executed application program.

12. The touch apparatus as claimed in claim 7, wherein the touch component is further configured to output the touch motions corresponding to the executed application program to the processing component according to a report rate, and the processing component is further configured to set the report rate to a first report rate, to determine whether a touch event occurs, to count a non-touch period when the touch event does not occur, and to adjust the report rate to a second report rate different from the first report rate when the non-touch period is smaller than a non-touch threshold.

\* \* \* \* \*